May 5, 1964　　　J. L. CLINGERMAN　　　3,131,574
CONTROL MECHANISM FOR HYDRAULIC SYSTEM
Filed Aug. 12, 1960　　　2 Sheets-Sheet 1

*INVENTOR.*
JOHN L. CLINGERMAN
BY William A. Murray

ATTORNEY

May 5, 1964   J. L. CLINGERMAN   3,131,574
CONTROL MECHANISM FOR HYDRAULIC SYSTEM
Filed Aug. 12, 1960   2 Sheets-Sheet 2
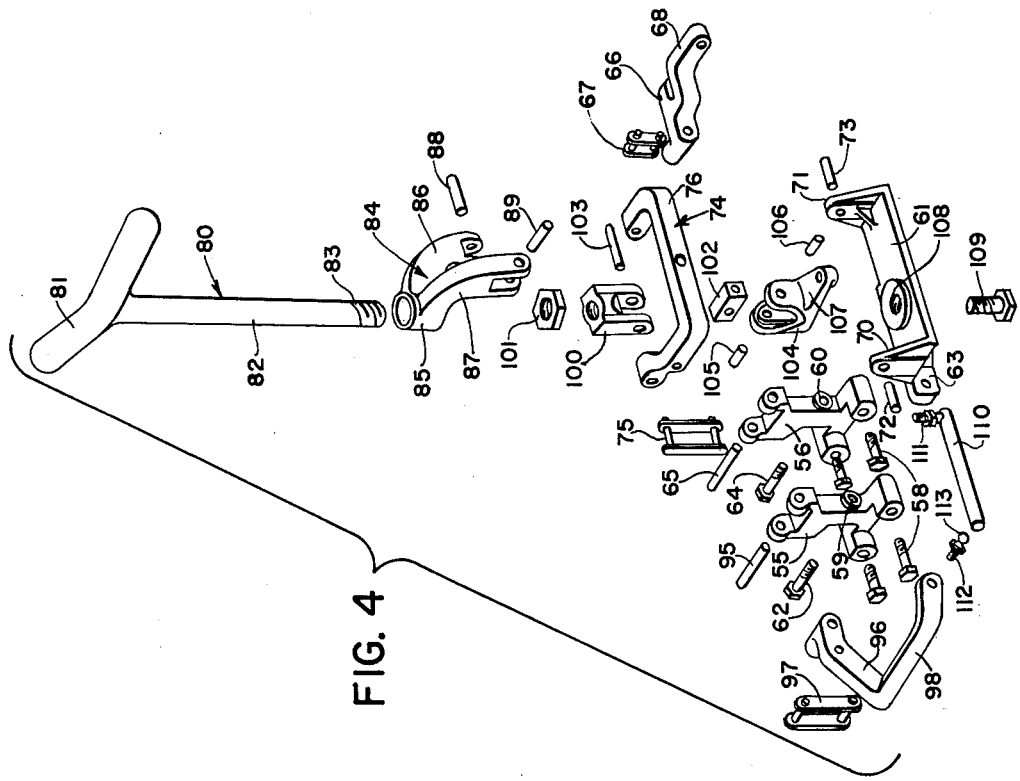
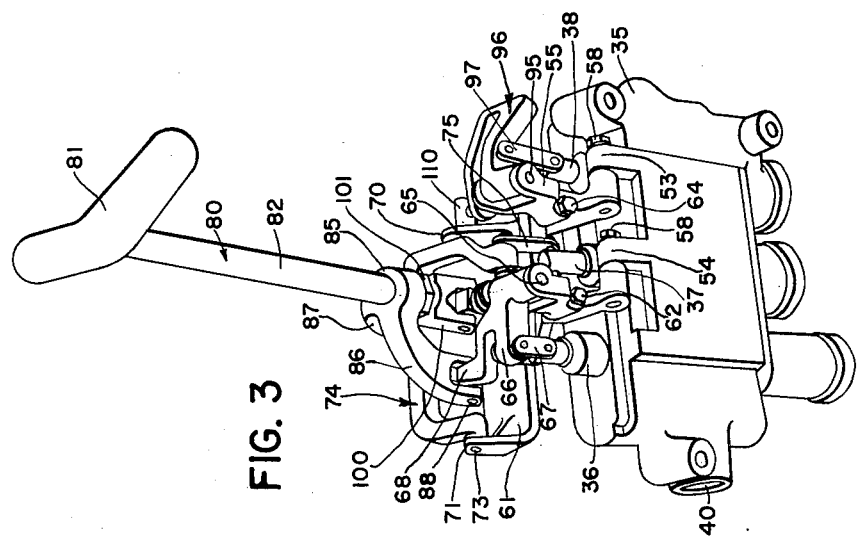
INVENTOR.
JOHN L. CLINGERMAN
BY William A. Murray
ATTORNEY

United States Patent Office 3,131,574
Patented May 5, 1964

3,131,574
CONTROL MECHANISM FOR HYDRAULIC SYSTEM
John L. Clingerman, Moline, Ill., assignor to Deere & Company, Moline, Ill., a corporation of Delaware
Filed Aug. 12, 1960, Ser. No. 49,347
11 Claims. (Cl. 74—471)

This invention relates to an hydraulic system. More particularly, this invention relates to a control mechanism for an hydraulic system having three separate hydraulic units and features a single lever for controlling all three of the units individually or in unison.

In U.S. Patent 2,950,550 which issued August 30, 1960, to Mr. John L. French, for a Bulldozer, there is shown and described a combination tractor-bulldozer assembly having an hydraulic system ideally arranged for the present invention. In the combination, there is provided a U-shaped main bulldozer frame extending around the forward end of the tractor which may be raised and lowered by hydraulic units which extend between the frame and the tractor. Positioned on the forward end of the U-shaped frame is a bulldozer blade that may be angled relative to the direction of travel by hydraulic units which extend between the blade and the U-shaped frame. There is also provided adjacent one end of the blade a third hydraulic cylinder which operates to raise or lower that end of the blade so that the blade may be titled. Therefore, there are provided three distinct hydraulic units for the bulldozer, one of which may raise or lower the boom or main frame, one of which may angle the blade, and one of which may tilt the blade. In operating a bulldozer as described, it is often desirable to operate all three of the hydraulic units at one time so as to avoid an obstruction, or to otherwise shape the earth being dozed.

It is therefore desirable and it is the main purpose of the present invention to provide an hydraulic control mechanism which features a single lever control which may be utilized to operate three hydraulic units such as in a bulldozer either individually or in unison. By providing a single lever control, the operator may use one hand to operate the tractor and the other hand to operate the bulldozer. Consequently, the tractor and bulldozer combination may be operated continuously and generally without stopping to reposition the blade. However, it should be understood that the present invention will operate in other environments and consequently the present environment is for illustrative purposes only.

Specifically it is proposed to provide control elements for the three hydraulic units which will normally be in the form of vertically disposed spool valves located adjacent to the operator's station. A valve control mechanism will consist of control arms articulately connected to each of the spool valves. A control lever will extend vertically from the control mechanism and will be connected to the individual control arms by further articulate means whereby movement of the lever in the fore and aft direction will operate one of the control arms and its respective spool valve and movement in a transverse direction will operate a second control arm and its respective spool valve. Movement in a diagonal direction will, of course, operate both the control arms and their respective valves. The control lever will be swively mounted and will be connected to the third or remaining control arm so that as the control lever is swivelled about its axes it will operate the third control arm and its respective valve. Again, the third control arm and its valve may operate individually or in conjunction with the other control arms and their valves.

Other objects and advantages of the present invention will become apparent to those skilled in the art and the nature of the invention is better understood from the following description and as shown in the accompanying drawings.

FIG. 3 is a top and slightly to the side perspective view showing the side of the valve control mechanism opposite to that shown in FIG. 2.

FIG. 4 is an exploded perspective view of the valve control mechanism.

Figure 1:
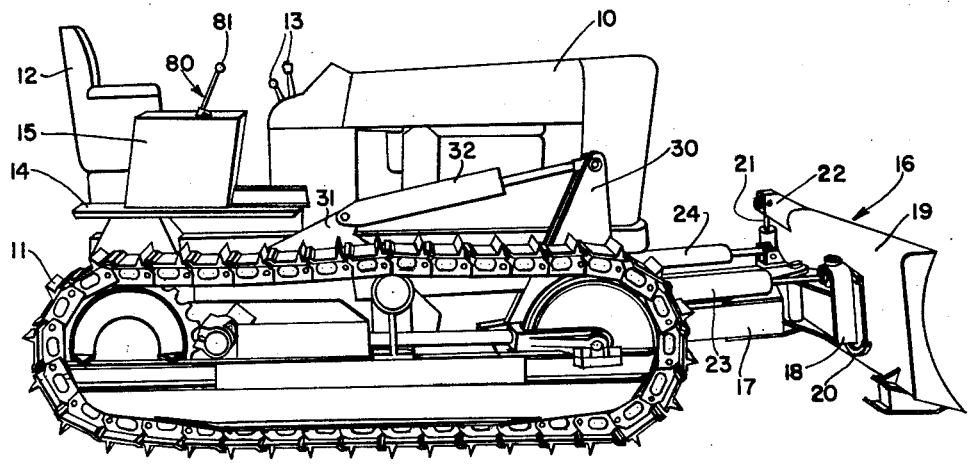
FIG. 1 is a side perspective view of a tractor-bulldozer assembly incorporating the principles of the present invention.

Referring first to FIG. 1, there is therein provided a track laying type tractor of conventional design with a centrally positioned fore and aft extending tractor body 10 having on opposite sides thereof a pair of continuous tracks, the one on the right side being indicated by the reference numeral 11. The tractor also has an operator station, its location being indicated by the operator's seat 12. Control levers 13 are provided to operate the tractor. On the right side of the operator's station and carried on a fender-type platform 14 is a control mechanism, disposed under a mechanism housing 15, which is utilized to operate a tractor-mounted bulldozer 16.

The bulldozer 16 is of a type generally shown and described in the aforementional John L. French patent and is composed of a U-shaped main frame pivotally connected at its rear end to the tractor and extending forwardly and around the forward end of the tractor body 10. Pivoted about a vertical axis and at the forward end of the U-frame 17 is a secondary frame 18 which lies adjacent to the rear surface of an earth moving bulldozer blade 19. Provision is provided between the sub-frame 18 and the blade 19 so that the blade 19 may swivel vertically about one end of the sub-frame 18. The swivelling type mounting structure is indicated generally at 20 in FIG. 1. Adjacent the opposite end of the sub-frame 18 is an hydraulic cylinder 21 which extends between the sub-frame 18 and the rearwardly projecting bracket structure 22 on the bulldozer blade 19. As the hydraulic cylinder 21 is extended and retracted, it will effect raising and lowering of that end of the bulldozer blade 19. A pair of horizontally disposed and fore and aft extending hydraulic cylinders 23, 24 extends forwardly from the side beams of the U-frame 17 to opposite ends of the sub-frame 18. The cylinders 23, 24 operate to angle the blade 19 relative to the direction of travel.

Extending upwardly from the respective side beams of the U-frame 17 is a pair of posts, one of which is shown at 30. Rearward of the posts and fixed to the tractor body 10 is a pair of upright structures, one of which is shown at 31. The post 30 and upright structure 31 are interconnected by means of an hydraulic cylinder 32. An hydraulic cylinder, not shown, is also provided on the opposite side of the tractor and between the post and upright structure on that side of the tractor. As is obvious, the hydraulic cylinder 32 and its counterpart on the opposite side of the tractor operate to raise and lower the U-frame 17 and the respective blade 19. The latter hydraulic cylinders, as well as the previously mentioned hydraulic cylinders 21, 23, and 24 are operated from the control mechanism contained under the housing 15.

Figure 2:
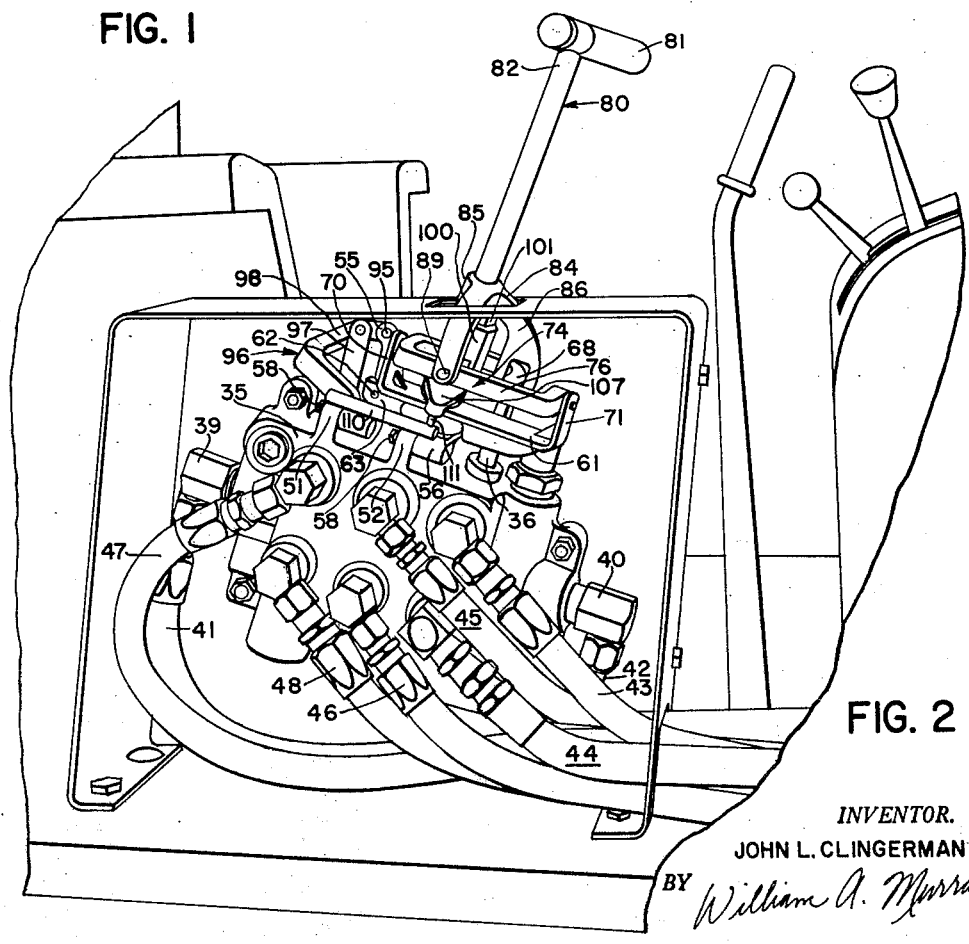
FIG. 2 is an enlarged side view of a portion of the tractor-bulldozer assembly and showing the valve control mechanism which operates the various hydraulic units on the bulldozer.

Referring now to FIGS. 2, 3, and 4 showing the valve mechanism and valve control mechanism, there is provided internally of housing 15 a valve casing 35 which carries a bank of upright fore and aft spaced apart operators in the form of spindle or spool valves, the tops of which are shown at 36, 37, and 38. The casing 35 has a fluid inlet and a fluid outlet indicated by the couplings 39 and 40 at the opposite ends of the casing. Hydraulic hoses 41, 42 are connected to the inlet and outlet 39, 40 respectively and operate to feed and withdraw hydraulic fluid from the casing 15. The fluid is controlled thru a standard type hydraulic system which is conventional with most types of tractors. Each of the operators or spool valves 36, 37 and 38 operate the hydraulic cylinders which perform one function of movement of the bulldozer blade 19. For example, and for purposes of illustration, the spool valve 36 operates to open and close suitable ports which feeds and withdraws fluid thru hoses 43, 44 which in turn moves fluid to and from the hydraulic cylinders 23, 24. A suitable divider valve is provided to effect equal distribution of fluid in the hydraulic cylinders 23, 24. The spool 37 operates to feed and withdraw fluid thru hoses 45, 46 which operate the hydraulic lift cylinders, one of which is shown at 32, on opposite sides of the tractor. Similarly, the spool valve 38 operates to feed and withdraw fluid thru suitable hoses 47, 48 which moves fluid into and from the hydraulic cylinder 21. The spool valves 36, 37, and 38 are of conventional design and consequently are described only generally. It is desirable to recognize that they are the control elements for the hydraulic cylinders or units on the bulldozers. Also, it should be recognized that the entire valve mechanism is here shown and described for the purposes of illustration, it being recognized that other and different types of hydraulic control mechanism would operate suitably and in substantially the same manner.

Upwardly projecting lugs 51, 52, 53 and 54 extend from the upper surface of the casing 35. Fixed to the lugs 51, 53, and 52, 54 respectively are upwardly projecting castings or support frames 55, 56. Bolts, as at 58, are provided to fix the lower end of the castings 55, 56 to the respective lugs 51, 53 and 52, 54. The castings 55, 56 are provided with openings 59, 60 respectively. A third support frame or plate casting 61 is fixed to the castings or support 55, 56 by means of bolts 62, 64, which extend through the openings 59, 60 and into tapped openings in a depending lip or flange 63 on the plate casting 61. Therefore, the castings 55, 56 and 61 provide a rigid support for the control mechanism for the hydraulic spool valves 36, 37, and 38.

The upper end of the casting 56 is bifurcated and receives a transverse pivot pin 65 on which is pivotally mounted a forwardly projecting and first control arm 66. The forward end of the control arm 66 is disposed above the spool valve 36 and is articulately connected to the upper end of the valve 36 by means of a linkage 67. Projecting to one side of the control arm 66 is a dog-leg shaped lug 68, the purpose of which will later become apparent.

The plate support or casting 61 is provided with upwardly projecting fore and aft spaced lugs 70, 71 which contain aligned pivot openings for receiving fore and aft pivot pins 72, 73 which in turn pivotally carry a second control arm 74. The control arm 74 has a terminating end projecting about the spool valve 37 and is articulately connected to the upper end of the spool valve 37 by means of linkage 75. The control arm 74 is also provided with a U-shaped portion 76 projecting on the opposite side of the pivot pins 72, 73 thru the terminating end. It should here be noted, as is obvious from viewing the drawings, that the first control arm 66 pivots about an axis on the pivot pin 65 which is transverse to the direction of travel, and the control arm 74 pivots about a fore and aft extending axis of the aligned pivot pins 72, 73. Consequently it is apparent that the pivoting axes of the control arms 66, and 74 are at right angles to one another.

An upright control lever 80 projects upwardly from the control mechanism and has at its upper end a T-shaped gripping part 81 with a lower and downwardly projecting shank portion 82. The shank portion 82 is rounded and is generally smooth except for a threaded lower end 83. Carried on the shank 82 above the threaded lower end 83 is a rigid bifurcated member 84 having a hub portion 85 swivelly carried on the smooth shank 82 and a pair of rigid angularly spaced bifurcated portions 86, 87 extending outwardly and downwardly from the hub portion 85. The portions 86, 87, as is apparent from viewing the drawings, are disposed at right angles to one another with one portion 86 projecting in a fore and aft direction and the other portion 87 extending in a transverse direction. The lower end of the fore and aft extending portion 86 extends over the dog-leg portion 68 of the first control arm 66 and is pivotally connected to the portion 68 by means of a fore and aft extending pivot pin 88. The transverse portion has its lower end bifurcated to be disposed on opposite sides of the U-shaped portion 76 of the second control arm 74 and is pivotally connected to the portion 76 by means of the tranverse pivot pin 89.

Viewing the control mechanism up to this point, it becomes apparent that movement of the control lever 80 in a fore and aft direction will cause control arm 66 to move about its pivot pin 65 and to actuate the control element or spool 36. Similarly, movement of the control lever 80 in a transverse direction will effect movement of the second control arm 74 to actuate the second control element or spool valve 37. Due to the articulate connections between the lever 80 and the arms 66, 74, the control lever 80 may move in a diagonal direction so as to actuate both control valves 36, 37 at the same time.

The upper end of the casting or support 55 is bifurcated and has transversely aligned openings which receive a transverse pivot pin 95 on which is carried a third control arm 96. The arm 96 projects over the spool valve 38 and is articulately connected to the upper end of the valve 38 by linkage 97. Viewing FIGS. 2, 3, and 4, it becomes apparent that arm 96 continues from the upper end of the linkage 97 downwardly and rearwardly a short distance and then continues in an arcuate portion 98 which extends around the rear end of the control linkage and has a terminal end generally to one side of the linkage as previously described.

Referring again to the control lever 80, the lower threaded end 83 is threadedly received in the upper end of a universal joint part or section 100. A lock nut 101 is provided to prevent loosening of the shank 82 in the joint or section 100. The lower end of the section of portion 100 is bifurcated with the furcation disposed on opposite sides of a block 102 and pivotally connected thereto by a pivot pin 103. The pivot pin 103 permits pivoting of the block 102 about a fore and aft axis. Upwardly projecting lugs of a lower universal joint section or part 104 are disposed on opposite sides of the block 102 and are pivotally connected thereto by means of transverse pivot pins 105, 106. The lower portion or section 104 has a transversely extending arm or lug portion 107 which has its outer end generally in fore and aft alignment with the terminal end of the arcuate portion 98 of the third control end 96. The ends are interconnected by a link 110, opposite ends of which may be bolted to the respective ends of the arm portion 98, and by portion 107 by means of bolts 111, 112. The bolts 111, 112 have integral ball ends, such as at 113, which may be received in opposite ends of the link 110 so as to provide articulate type connections between the portion 98 and the arm 107.

Relative to operation of the third arm 96 and the operation of the respective control valve 38, such may be done by swivelling the control lever 82 about its own axis. This will in effect move the arm or leg 107 fore and aft to cause movement of the arcuate portion 98 fore and aft. Since the portion 98 is disposed beneath the pivot pin 95, the control arm 96 will therefore be raised or lowered which will result in raising or lowering of the control valve 38. Due to the universal type joint 100—106, and the ball joint 113 the lever may be moved in any direction without effecting a swivelling motion and a consequential movement of the third control arm 96.

However, should it be desired to operate the control arm 96 at the same time that movement of the other control arms is desired, such may be had by merely swivelling the control lever 82 while at the same time moving the control lever fore and aft and/or transversely as is desired. The support 61 is provided with a plastic bushing 108. A bolt 109 extends through the bushing 108 and is threadedly received in the lower section 104.

While only one form of the invention has been shown, it should be recognized that other forms or variations will occur to those skilled in the art. Also, the valve structure and the control mechanism for the valve structure was here illustrated for use on a bulldozer for purposes of illustration and it should be recognized that other types of implements and hydraulic systems in which a single lever type control could be utilized would operate successfully under the present control system. Therefore, it should be recognized that other forms and variations will occur to those skilled in the art and it was not the intention in presenting the present disclosure in concise and detailed manner to limit or narrow the invention beyond the broad concepts set forth in the appended claims.

What is claimed is:

1. A control mechanism comprising: a support frame; first, second, and third operators; a first control arm extending from the first of said operators; a first articulate connection between the first operator and the first control arm; the second control arm extending from the second operator; a second articulate connection between the second operator and the second control arm; means pivotally connecting the first and second arms to the frame; a control lever; means supporting the control lever to permit the lever to move in at least two directions and to swivel; means connecting the first and second control arms to the lever so that as the lever moves in one of said two directions said first control arm will actuate the first operator and as the lever moves in the other of said two directions said second control arm will actuate the second operator; a third control arm pivotally mounted on the frame; an articulate connection between the third control arm and the third operator; and linkage means extending between the third control arm and the lever and effective upon swivelling of the lever to actuate said third operator.

2. A control mechanism comprising: a main support; first, second, and third control elements; a first control arm extending from the first of said control elements; a first articulate connection between the first element and the first control arm; a second control arm extending from the second control element; a second articulate connection between the second element and the second control arm; means connecting the first and second arms to the support to pivot about respective axes at right angles to one another; a control lever; means supporting the control lever to permit the lever to move in at least two directions and to swivel; means connecting the first and second control arms to the lever so that as the lever moves in one of said two directions said first control arm will actuate the first control element to the exclusion of actuation of the second control element and as the lever moves in the other of said two directions said second control arm will actuate the second control element to the exclusion of actuation of the first control element; a third control arm pivotally mounted on the support; an articulate connection between the third control arm and the third of said control elements; and linkage means extending between the third control arm and the lever and effective upon swivelling of the lever to actuate said third control element without actuating the first and second control elements.

3. The invention defined in claim 2 in which the said means connecting the control arms to the control lever is in the form of a bifurcated member having a hub portion swivelly carried on the lever and rigid angularly spaced bifurcated portions extending to and articulately connected to the first and second control arms respectively.

4. A control mechanism comprising: a support frame; a pair of spaced control elements; a control arm extending from one of said control elements; a first articulate connection between said one control element and the first control arm; means pivotally connecting the control arm to the frame; a control lever; means pivotally supporting the control lever on the frame to permit the lever to move in at least one direction and to swivel; means connecting the control arm to the lever so that as the lever moves said control arm will actuate the said one control element; a control arm pivotally mounted on the frame; an articulate connection between the latter control arm and the other of said control elements; and linkage means extending between said latter control arm and the lever effective upon swivelling of the lever to effect actuation of said latter control element.

5. A control mechanism comprising: a support frame; first, second, and third control elements; a control lever; first, second, and third control arms articulately connected to the respective control elements; and means connecting said first, second, and third control arms to said lever whereby movement of said lever in one direction will effect movement of the first control element to the exclusion of the other two control elements, movement of said lever in a direction normal to said one direction will effect movement of a second control element to the exclusion of movement of the other two control elements, and swivelling of the lever will effect movement of a third control element to the exclusion of the other two control elements.

6. A lever control mechanism comprising: a support frame; three spaced apart control elements; a first control arm extending from the first of said control elements and having a terminal end; a first articulate connection between said first element and said first control arm; a second control arm extending from the second of said control elements having a terminal end adjacent the terminal end of said first arm; a second articulate connection between said second control element and said second arm; means pivotally interconnecting the terminal ends of said control arms permitting movement of one arm relative to the other arm; pivotal support means between the terminal ends of said control arms and the frame; a lever mounted on said control arms effective in movement in a first direction to adjust said first control arm, in movement in a second direction to adjust said second control arm, and in a direction having components in both first and second directions to adjust both control arms; link means extending from the third of said control elements and having a terminal end offset to one side of the lever; and an arm mounted on the lever and connected to the terminal end of the link means for effecting adjustment of the third control element in response to swivelling of the lever.

7. The invention defined in claim 6 whereby said articulate connecting means will permit swivelling of the lever while at the same time permitting said lever to move in a direction having components in either or both of the first and second directions.

8. A lever control mechanism comprising: a support frame; three spaced apart control elements; a first control arm extending from the first of said control elements; a first articulate connection between said first element and said first control arm; a second control arm extending from the second of said control elements; a second articulate connection between said second control element and said second arm; means pivotally interconnecting the control arms permitting movement of one arm relative to the other arm; a lever mounted on said control arms effective in movement in a first direction to adjust said first control arm, in movement in a second direction to adjust said second control arm, and in a direction having components in both first and second directions to adjust both control arms; link means extending from the third of said control elements and having an end offset to one side of the lever; and an arm mounted on the lever and connected to the terminal end of the link means for effecting adjustment of the third control element in response to swivelling of the lever.

9. A control mechanism comprising: a support; first, second, and third operators; a first arm pivoted on the support about a first axis and connected to the first operator; a second arm pivoted on the support about a second axis at right angles to and intersecting the first axis and connected to the second operator; a control lever having opposite ends with one end being adapted for manual manipulation; an arm control structure having a hub portion swivelled on the lever and first and second radial elements normal to one another and extending from the hub portion to outer ends; pivotal connecting means between the outer ends and the respective first and second arms effective to permit adjustment of one arm without adjustment of the other; a third arm pivotally mounted on the support and connected to the third operator; a linkage extending from the arm offset to the side of the lever; and a third radial element connected to the other of the ends of the lever to articulate about the point of intersection of the axes and having a radial outer end connected to the linkage whereby adjustment of the third operator may occur by swivelling the lever.

10. A control mechanism comprising: a support, first, second, and third operators; a first arm pivoted on the support about a first axis and connected to the first operator; a second arm pivoted on the support about a second axis at right angles to and intersecting the first axis and connected to the second operator; a control lever having opposite ends with one end being adapted for manual manipulation; an arm control structure having a hub portion swivelled on the lever and first and second radial elements normal to one another and extending from the hub portion to outer ends; pivotal connecting means between the outer ends and the respective first and second arms effective to permit adjustment of one arm without adjustment of the other; a third arm pivotally mounted on the support and connected to the third operator; a third radial element connected to the other of the ends of the lever to articulate about the point of intersection of the axes and having a radial outer end; and connecting means between the outer end and the third arm whereby adjustment of the third operator may occur by swivelling the lever.

11. The invention defined in claim 10, in which the first and second elements are connected to the respective first and second arms by pivots substantially on the second and first axes respectively.

References Cited in the file of this patent

UNITED STATES PATENTS

| | | |
|---|---|---|
| 2,664,708 | Norelius | Jan. 5, 1954 |
| 2,745,624 | Turchan | May 15, 1956 |